Oct. 16, 1962     E. A. GOVATSOS     3,058,758

CHECKBOOK

Filed Aug. 12, 1959     2 Sheets—Sheet 1

Oct. 16, 1962 E. A. GOVATSOS 3,058,758
CHECKBOOK
Filed Aug. 12, 1959 2 Sheets-Sheet 2

Inventor
Edward A. Govatsos
by Morse + Altman
Attys.

United States Patent Office 3,058,758
Patented Oct. 16, 1962

3,058,758
CHECKBOOK
Edward A. Govatsos, 215 Turnpike St., Canton, Mass.
Filed Aug. 12, 1959, Ser. No. 833,240
6 Claims. (Cl. 282—23)

This invention relates to an improved checkbook of the type wherein the salient data written on a check is automatically reproduced on a permanent leaf of the checkbook without the use of carbon paper, and the numerical entries are so arranged as to facilitate the keeping of a running account of the funds on deposit. Since the time when checkbooks first came into use, it has been customary to provide books the pages of which comprised one or more stubs having suitable blank spaces to receive data to be written on the check or checks attached to the stubs along perforated lines. This means that much of the data must be written twice with obvious opportunities for errors. Efforts have been made to shorten this procedure by the use of carbon papers between each check and an underlying record sheet or page. If a single sheet of carbon paper is employed, it is necessary to reposition it after each check has been written. This requirement is troublesome and objectionable. Interleaving carbon paper between all of the checks and their record sheets is expensive and a nuisance as the carbon sheets must be torn out and disposed of. More recently, pressure-sensitive coatings have been developed for the underface of each check and the contiguous upper face of the record sheet beneath it. The local pressure of the writing implement on the check results in a duplication of the writings on the record sheet. One difficulty with this system is that the writing pressure on the top check is felt not only on its record sheet but also on the next check and its record sheet. The marks on the latter sheet tend to mix with and confuse the writings on the second check which are duplicated on the second record sheet. This confusion can be avoided by placing under the record sheet of the check to be written on a plate or sheet of sufficient stiffness to spread the pressure of the writing implement so that duplication of the marks made on the check will be confined to the record sheet in contact therewith. This practice, however, is objectionable as it involves repositioning the plate or stiff sheet each time and is apt to make trouble by being inserted in the wrong place. Carbon paper is habitually placed between the sheet to be written upon and the record sheet immediately beneath it. If the plate or stiff sheet should be similarly placed because of carelessness or force of habit, no duplication would occur.

According to the present invention checks and record sheets with duplicating coatings are employed but confusion of duplicated writings is avoided without resort to a stiff plate or sheet to underlie the record sheet which is to receive the duplication of the writings. The invention also includes certain safety features hereinafter described.

For a more complete understanding of the invention, reference may be had to the following description thereof and to the drawings, of which FIGURE 1 is a face view of a detachable check embodying part of the invention;

FIGURE 2 is a face view of the permanent sheet underlying the check shown in FIGURE 1;

FIGURE 3 is a face view of the detachable check underlying the sheet shown in FIGURE 2;

FIGURE 4 is a face view of the permanent sheet underlying the check shown in FIGURE 3;

Figure 5:
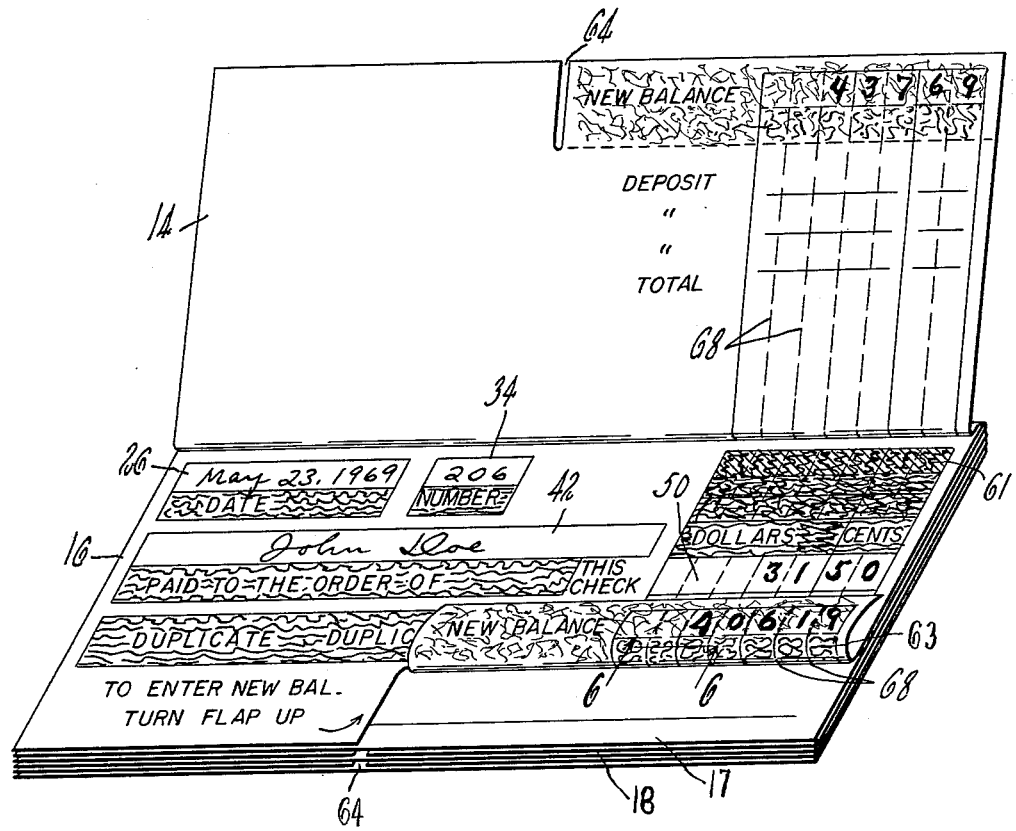
FIGURE 5 is a perspective view of a checkbook having alternate checks and sheets as shown in FIGURES 1 to 4.

The checks illustrated in the drawings may be of conventional size and shape but are preferably bound into book or block form along the top edges rather than along the end edges at the left. The checks in the checkbook are printed in two forms which alternate throughout the checkbook, the odd checks, including the first check 10, being as shown in FIGURE 1, the even checks, including the second check 12, being as shown in FIGURE 3, or vice versa. Interleaved between the checks are permanently bound odd and even record sheets like the first and second records sheets 14 and 16 which directly underlie checks 10 and 12 respectively. In FIGURE 5, the third check is indicated as 17 and the third record sheet as 18. The reverse face of each check and the obverse face of each record sheet are coated with substances such that when the check is written upon, the pressure of the writing instrument acts through the check upon the coatings to reproduce visible marks on the record sheet duplicating the marks made on the check. Paper sheets thus treated are described in Patent No. 2,730,456, and a method of making the coatings is described in Patent No. 2,800,457. Since the coatings on the checks and record sheets respond to pressure, the marks made on a check will usually be duplicated not only on the record sheet next to the check but also to a lesser extent on the record sheet which directly underlies the next check, that is, marks made on the top check 10 will be duplicated not only on the record sheet 14 but also, more lightly, on the record sheet 16. When the check 12 is thereafter filled out, the marks made thereon will be duplicated on the record sheet 16 on which a duplication of the marks on the check 10 have already appeared. In order to avoid the confusion which would be caused by superposition of the two sets of marks on the same record sheet, the spaces to be filled out on the odd checks are offset from the corresponding spaces on the even checks and the corresponding spaces on the record sheet immediately under each check are blank so as to show duplications of marks made on that check. The offset spaces are printed upon with arbitrary or random designs which render unreadable any marks made thereon. Thus marks made on a check will be reproduced in corresponding blank spaces on the record sheet next to it, but the fainter reproduction on the record sheet that comes after the next check will be concealed by the random printing which covers the area on which such reproductions are made. The marks made on check 12 may also be duplicated faintly or virtually invisibly on the third record sheet 18. This record sheet would mate with an odd numbered check 17 and be identical with record sheet 14. Such almost invisible impressionn as may chance to appear on this sheet, however, would be completely obscured and dominated by the duplicate impression deposited on this sheet by an entry made on its mating check.

The drawings illustrate checks and record sheets embodying the invention. The check 10 has a space 20 for the date, the lower part of which is left blank to receive the entry. A similarly arranged space 22 on the record sheet 14 directly underlies the space 20. The space 24 for the date on the check 12 occupies a similar area but in this case the upper part is left blank to receive the entry, the same arrangement being shown at 26 on the record sheet 16. In like manner spaces 28 and 30 are provided on the check 10 and record sheet 14 for the serial number, the lower part of each of these spaces being left blank, whereas the upper parts of similar spaces 32 and 34 on the check 12 and record sheet 16 are left blank. So also for the spaces 36, 38, 40 and 42 on the checks and record sheets for the name of the payee, and spaces 44, 46, 48 and 50 for numbers representing the amounts for which the checks are drawn. Since there is no need for the written words showing the number of dollars for which a check is drawn to appear on the record sheet, the space on the latter underlying the space 52 on the check 10 is covered with a random printed design as at 54 on record sheet 14. Likewise, a blank space 56 is provided on check 12 for written words showing the amount, overlying a printed area 58 on the record sheet 16.

When a new account is opened or when a fresh checkbook is started, the initial deposit or the balance from the old checkbook must be entered on the first record sheet 14. For this purpose a space 59 is provided in the upper right hand corner. In writing the amount of such initial deposit or balance carried over from the old checkbook the figures written in the space 59 on the first record sheet 14 will be reproduced on the corresponding space 61 on the second record sheet 16. Unless this duplicate figure is concealed, it can cause confusion and error in the figuring done on the second record sheet 16 and possibly on the third record sheet 18. The marks on the third record sheet 18 resulting from writing done on the first record sheet 14 would be comparatively faint as the writing pressure would be through four thicknesses of paper, namely, the first record sheet 14, the second check 12, the second record sheet 16, and the third check 17. To conceal the relatively faint marks on the third record sheet 18 resulting from the entering of figures in the space 59 on the first record sheet 14, the corresponding space on the third record sheet 18 is covered with light color or light colored arbitrary designs, the color being preferably the same as the duplicating marks which will result from writing on the space 59 of the first record sheet 14, such color being determined by the coating substances used. For economy in printing and collating the checks and record sheets to be bound together, all the odd record sheets should be the same, and all the even sheets should be the same. Hence, if the third record sheet 18 has a colored area registering with the area 59 on the first record sheet 14, then the area 59 itself will be similarly colored, but not sufficiently to conceal the figures entered therein. The area 61 on the second record sheet 16 is more darkly imprinted with random designs since writing pressure on the area 59 of the first record sheet 14 will have to go through only two thicknesses of paper, namely, the first record sheet 14 and the second check 16, so that the duplicating marks will be relatively heavy in the space 61 and will need darker or heavier designs to conceal them. On the drawings the spaces 59 are hatched to indicate green by way of example, but any other color of ink may be used to match the color of the duplicating marks. Since the second record sheet is an even sheet, all the other even sheets are made with a similar area 61 for uniformity although these areas in the other even sheets are without functional significance since it is only on the first record sheet 14 that an entry is made in the area 59.

Figure 6:
FIGURE 6 is a fragmentary sectional view of a sheet considerably magnified.

A space 60 is provided on the check 10 in the usual place near the bottom for the maker's signature. The corresponding space 62 on the record sheet 14 is covered with arbitrary or random printed designs which conceal the reproduction of the signature on the record sheet. When a check is signed by the use of a ball-point pen, however, an intaglio impression of the signature is apt to be made in the record sheet beneath it, thus providing a reproduction of the signature which can often be copied by a forger. To guard against this possibility, the area 62 on the record sheet 14 is covered with random embossed designs 63 which are intaglio on the obverse face so that the indentations in this area caused by the pen when the check is being signed will be lost in the grooves of the random intaglio designs on this area. A magnified sectional view of this embossed area is shown in FIGURE 6.

The space 62 on each record sheet is made into a foldable flap by a notch or cut 64 extending in from the bottom edge of the sheet and a crease line 66 extending horizontally from the inner end of the notch 64 to the right hand edge of the sheet. On the under face of each record sheet are vertical lines 68 for columns of numerals representing dollars and cents. These lines register with vertical lines in the spaces 46 and 50, so that when a flap bearing the space 62 is folded up as indicated in FIGURE 5, the vertical lines on the under face of the flap will be exposed and will be aligned with the corresponding vertical lines in the space 50 on the obverse face of the same sheet and with the vertical lines 68 on the under face of the preceding record sheet. When a check has been filled out and removed, the amount of the check will appear in the space 50 which will be immediately above the under face of the flap when the latter is folded up as indicated in FIGURE 5. The amount of the check is then readily subtracted from the balance shown on the under face of the previous record sheet, the difference being entered on the exposed face of the flap which is thereupon folded back to its original position. When the following check is to be filled out, the record sheets preceding it must be swung up out of the way like the sheet 14 shown in FIGURE 5. The new balance which has been entered on the under face of the latest record sheet will then be visible and its location will facilitate the subtraction of the amount of the new check from the balance shown on the latest record sheet.

I claim:

1. A checkbook comprising a series of detachable checks one upon another and a record sheet under each check, the obverse face of each record sheet and the reverse face of the check upon it being coated with materials responsive to local pressure to cause visible marks to appear on said obverse face of the record sheet when the check is written upon, each of said checks and record sheets having designated spaces for data entries, the spaces on alternate checks being mutually offset, the spaces on each said record sheet registering with those of the check immediately above it.

2. A checkbook comprising a series of detachable checks one upon another and a record sheet under each check, said checks and their sheets being alternately odd and even, at least one of the mutually touching faces of each check and its record sheet being coated with materials responsive to local pressure to cause visible marks to appear on the obverse face of the record sheet when the check is written upon, each said check and its record sheet having designated spaces on its obverse face for receiving writing, said spaces on the odd checks and record sheets being offset from corresponding designated spaces on the even checks and record sheets, the spaces on each record sheet which register with said designated spaces on the succeeding record sheet being covered with random indicia to render illegible marks made thereon.

3. A checkbook as described in claim 2, each said odd record sheet having near its upper right hand corner a space covered by light random designs for the entry of writing, each said even record sheet having a corresponding space covered with dark random designs to render illegible marks made thereon.

4. A checkbook comprising a series of detachable checks one upon another and a record sheet under each check, said checks and their record sheets being alternately odd and even, at least one of the mutually touching faces of each check and its record sheet being coated with materials responsive to local pressure to reproduce on the record sheet marks written on the check, each check having designated spaces for receiving writing, each said record sheet having similar designated spaces registering with those of the check immediately upon it, the designated spaces on alternate checks being differently located, the spaces on the odd checks and their record sheets being offset from the corresponding spaces on the even checks and their record sheets, each said check having a signature space thereon, each said record sheet having a space registering with said signature space and covered with random designs of printing and intaglio embossing.

5. A checkbook comprising a series of detachable checks one upon another and a record sheet under each check, each record sheet having a cut extending up from the bottom edge thereof and a crease line extending horizontally from the upper end of said cut to an end edge of the record sheet, said cut and crease line defining a foldable flap, vertical columns for figures on the reverse face of said flap, and vertical columns for figures on the obverse face of said sheet above said flap.

6. A checkbook comprising a series of detachable checks one upon another and a record sheet under each check, said checks and their sheets being alternately odd and even, at least one of the mutually touching faces of each check and its record sheet being coated with materials responsive to local pressure to cause visible marks to appear on the obverse face of the record sheet when the check is written upon, each said check and its record sheet having designated spaces on its obverse face for receiving writing, said spaces on the odd checks and record sheets being offset from corresponding designated spaces on the even checks and record sheets, the spaces on each record sheet which register with said designated spaces on the succeeding record sheet being covered with random indicia to render illegible marks made thereon, each said check having a space near the bottom thereof for a signature, each said record sheet having a space registering with the signature space on the check above it and covered with random marks to render illegible any marks thereafter appearing thereon, each said record sheet having a cut extending up from the bottom edge thereof to define a foldable flap coextensive with said registering space, and vertical lines on the reverse face of each said record sheet indicating columns on said flap vertically aligned with one of said designated spaces on the obverse face thereof.

References Cited in the file of this patent
UNITED STATES PATENTS

| | | |
|---|---|---|
| 1,432,020 | Fales | Oct. 17, 1922 |
| 2,310,394 | Case | Feb. 9, 1943 |
| 2,777,780 | Cormack et al. | Jan. 15, 1957 |